July 29, 1958
S. A. RATHE ET AL
2,845,181
FILTER ELEMENT
Filed Nov. 26, 1954
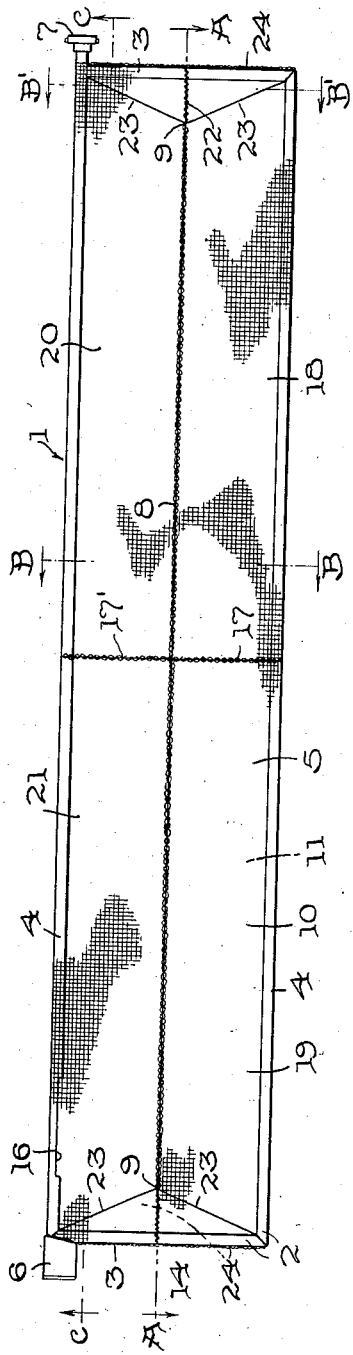
INVENTORS
SIDNEY A. RATHE
WILLIAM F. VANLOENEN
BY
James E. Toomey
ATTORNEY

United States Patent Office

2,845,181
Patented July 29, 1958

2,845,181

FILTER ELEMENT

Sidney A. Rathe and William F. Van Loenen, Baton Rouge, La., assignors to Kaiser Aluminum & Chemical Corporation, Oakland, Calif., a corporation of Delaware Application November 26, 1954, Serial No. 471,366

6 Claims. (Cl. 210—486)

This invention relates to a filter element, and more particularly to an improved filter leaf such as those employed in pressure filters of the Kelly filter press type.

One of the most widely used filtering apparatus in the heavy chemical industries, which treat raw ores for the recovery of valuable products therefrom, is the pressure filter originally designed by David J. Kelly for use principally in the cyanide process for recovering precious metals from their ores. The particular filter press, for example, such as described in his Patents Nos. 815,021 and 864,308 generally includes a stationary cylindrical filter tank into which a plurality of canvas covered rectangularly shaped foraminous leaves are inserted on a filter carrier. The carrier provides a supporting means for the filter elements or leaves and a convenient means for removing same from the tank for filter cake discharge, as well as for changes in the filter medium. The liquid containing suspended solid matter is pumped into the filter tank, usually under high pressures, wherein the cake deposits on both sides of the leaves. The filtrate is removed from the tank after passing through the filter leaves. The filter leaves are usually of rectangular configuration when viewed from the side and have means associated therewith for firm placement on the carrier and for proper spacing thereof one from the other.

The herein described invention is directed to a filter element about which a filter medium may be placed and which may be used most advantageously in pressure filters of the Kelly type. The filter element is especially characterized by its simplicity of design, ease of fabrication and efficiency in operation with liquids having scale forming compounds dissolved therein.

Filter elements or filter leaves of varying design have heretofore been employed in high pressure filtration operations. However, in general, the high pressures involved dictate the employment of a filter element which affords a common support for the filter medium on both sides of the filter leaf. Thus, each leaf frequently consists of a heavy wire screen that is rigidly secured in the leaf frame elements. These frame elements, in such cases, usually are rolled steel shapes which encompass the edges of the screen and overlap the extreme outer surface areas thereof on both sides and in such a manner as to rigidly secure the screen in place. The screen, or in some cases two or more screens adjacent one another in surface contacting relationship, forms the drainage element and the steel shape provides rigidity, protects the filter cloth and the edges of the screen. Additionally, the overlapping frame element provides a channel for the filtrate and passageway to the leaf filtrate discharge. The firm backing afforded by the singular sheet of wire screen or surface contacting layers thereof is normally deemed necessary because of the high pressures involved in the pressure type filtration operations. These high pressures tend to collapse the screen inwardly when the screens are separated by a space so as to afford freer filtrate movement.

Still other filter element designs have employed screen or other foraminous sheet material which is wrapped around a frame so as to provide freedom of movement of the filtrate between the oppositely faced screens, the resistance to the pressure being overcome by providing backing between the opposite sides or faces of the screen such as in the form of spaced bars within the filter element between the members forming the periphery thereof.

These filter elements of the prior art, in general, have certain drawbacks which make them less satisfactory for utilization with liquids of the scale forming type which have suspended solid matter associated therewith. An excellent example of a liquid which is extremely difficult to handle in filtering apparatus because of its tendency to deposit scale on the filter element, as well as the filter medium, is the caustic aluminate containing liquids or liquors found in the Bayer process. In the Bayer process a supersaturated solution of alumina is produced which has associated therewith insoluble red mud particles from the digestion phase. These liquors are frequently subjected to a decantation operation, wherein a major portion of the suspended material is separated from the pregnant liquors and the remaining residues thereafter separated by high pressure filtration in apparatus of the Kelly filter type. Because of the supersaturated nature of the liquors, the dissolved alumina tends to precipitate as hydrated alumina on the filter elements as well as the filter medium, depositing thereby a hard scale which is not removable from within the confines of the leaf by normal mud removal operations wherein the red mud cake is washed off the filter by high pressure hosing operations. Consequently, frequent treatments of the frame apparatus are required to dissolve the scale which, if permitted to accumulate, will eventually render the leaf completely inoperable.

When a common backing for both sides of the filter medium having more than one surface contacting screen is employed, the scaling situation is aggravated by the large amount of surface area provided in extremely close spaced relationship with adjacent surface areas and bridgement of the scale takes place between the adjacent surface areas. Still further, because of the manner in which screens of this nature are attached to the frame, a more or less inaccessible zone is created in which the scaling prevents the free flow of filtrate from the body of the filter leaf to the conducting passage formed by the supporting frame.

If spacing bars are employed between the two sides or faces of a double screen filter element, the scale would eventually form a compact mass across the spacing elements and materially clog the means for withdrawing the filtrate from within the element. These situations are further aggravated by the seeding action of the scale deposits which accelerate the deposition of further amounts of scale.

It is an object of this invention to provide a filter element which is especially applicable for use with liquids which deposit scale forming compounds of, for example, the precipitate from Bayer process liquor. It is another object of the invention to provide a filter element which is simple in design and so constructed as to afford easy removal of the scale which deposits thereon. Another object is to provide a filter element having a maximum filtration surface area and characterized by free filtrate movement within the element.

The filter element in the instant case is characterized by the combination of a wrap around type screen construction and a novel method of securing the two sides of the screen in a manner which provides minimum adjacent surface area for scale bridgement and maximum interstitial spacing for filtrate flow. The leaf is furthermore so constructed as to provide rigidity and strength while permitting advantageous flexing of the screen between filtration cycles so as to break off scale deposits formed thereon, especially by bridgement between adjacent sides thereof.

The filter element and its advantages are best described with reference to the accompanying drawings wherein Figure I is a schematic side elevation of the new filter element.

Figure II is a sectional view along the line A—A of Fig. I showing terminal weld points and the spaced relationship thereof with regard to the end members of the frame and furthermore showing intercommunicating passageways which afford ready access of filtrate from one filtrate zone to the other.

Figure III is a sectional view along the line C—C of Fig. I showing the relaitonship of parts in the top longitudinal frame member with the surrounding screen removed.

Figure IV is a sectional view along the line B—B of Fig. I showing the filtrate zones defined by the weld and the screen.

Figure V is a sectional view along the line B'—B' of Fig. I showing the separation of the screen in the regions between the treminal weld points and the end members.

With particular reference to Figures I and IV of the drawings, the filter element is generally designated as 1 and comprises a frame 2 which includes end members 3 and longitudinal members 4. A screen 5 is tightly wrapped around the exterior surface of the frame 2 including the outer surface of longitudinal members 4 and end members 3. In this manner the exterior surface of the frame members 3 and 4 are covered with screen as well as both faces of the filter element such as, for example, by side screen portions 10 and 11. The side screen portions 10 and 11 are secured together between terminal weld points 9 spaced from said members 3 along a longitudinal weld joint 8 substantially parallel to and equispaced from longitudinal members 4. It is apparent, as for example, from Fig. IV, that the space between side screen 10 and side screen 11 is divided, by means of the weld 8 between the terminal weld points 9, into an upper filtrate zone 12 and a lower filtrate zone 13 which intercommunicate by means of passageways 14 formed between the terminal weld points 9 and end members 3. This is best brought out by the sections shown in Fig. II and Fig. V wherein it is apparent that upper filtrate zone 12 and lower filtrate zone 13 intrecommunicate by means of passageways 14 found between the flaring portions 15 of the screen 5 between the terminal weld points 9 and end members 3.

Frame seat 6 is located at one end of the filter leaf 1 and at the other end is a union 7 which provides a means for connecting the element to a filtrate discharge. From the drawings, it is apparent that the screen 5 surrounds substantially all of the exterior surface of the end members 3 and the longitudinal members 4 as well as the sides of frame defined by the end and longitudinal members, all of which would normally face the filter medium. Of course, that portion of the frame which is connected to the frame seat 6 and the portion of the longitudinal members 4 leading directly to the union at the filtrate discharge 7 are not usually covered with screen since these elements are not usually covered by filter medium as is well known. Accordingly, maximum effective filtration area is approached in this type of design.

A slot 16 is provided in the upper longitudinal member 4 through which the filtrate from filtrate zones 12 and 13 is withdrawn and passed through the union 7 for discharge from the element. It is apparent that the longitudinal member 4 in this case provides a common means for withdrawing the filtrate from both filtrate zones 12 and 13 which are connected in particular by passageways 14 between the end member 3 and the terminal weld points 9. Obviously, the slot may be placed elsewhere in the longitudinal and/or end members. Similarly, other means for withdrawing the filtrate may be employed within the scope of the invention.

It is apparent that the flaring nature of the screen 5 between the longitudinal weld 8 and the longitudinal members 4 as well as between the terminal welds 9 and end members 3 provides an approach to maximum spacing for free movement of filtrate and further provides for a practical minimum amount of adjacently contacting surface areas which facilitate bridgement of scale therebetween within the confines of the screen. In fact, it has been found that the particular design is most successful in operation since the high pressures employed during filtration tend to collapse the sides of the screen to some extent and the scale deposited during the filtration cycle readily chips or breaks off during depressurization and cake removal operations. Thus, during depressurization the screen returns to its original shape and breaks off or loosens the particles of scale which form during the filtration cycle, thus preventing appreciable internal bridgement between the opposite faces or sides of the element.

It is apparent that other and different types of frame seats and filtrate discharge means may be employed in conjunction with the filter element design and still remain within the scope of the invention and accordingly, the invention is not to be construed as limited by those shown on the drawings.

Likewise, it is apparent to those skilled in the art that more than one screen may be employed in fabrication operations whereby each screen covers a portion of the overall surface area of the element. Thus, the screen 5 covering the frame may be composed of four individual screen portions more or less symmetrically arranged so that each covers about ¼ of the overall filtration surface area. Thus, two screen portions 18 and 19 of screen 5 can be butt welded as at 17 and tightly wrapped around the bottom longitudinal element 4 in a manner such that the ends terminate along weld 8 and whereat they meet upper screen portions 20 and 21 which are likewise butt welded along a weld such as indicated at 17' and wrapped around the upper longitudinal element 4. The flaring portions 15 of screen 18 can be welded to screen 20 as, for example, along butt weld 22, and screen 21 and 19 similarly fabricated. Each of the screen portions are preferably bent in a brake so as to form flaring portions such as 15 between the terminal weld points 9 and the end members 3 and the ends of the screen portions welded to the end elements 3 along the outer edges thereof as at 24. Thus, as a result of the bending, bends 23 may be appropriately made which extend from the terminal points 9 to the corners of the frame structure.

As is apparent, the above method of fabrication is not critical but rather merely descriptive of one method for developing the structure embodying the invention herein described.

Still further, although welding is advocated as the most preferable means for securing the side screens 10 and 11 together between the terminal weld points 9, it is apparent that other means for securing the sides together may be employed. It is essential, however, that the side portions be rigidly secured together between the terminal points 9 and that the latter be spaced from the end members 3 in order to realize the full benefits of the invention. It is furthermore essential that intercommunicating passageways be provided between the terminal points 9 and the end members 3 so as to attain free filtrate passage between the upper and lower filtrate zones 12 and 13 respectively.

Also, as is apparent, the employment of a slot in only one longitudinal element is not critical to the design but rather one or a plurality of slots may be employed in any of the frame elements as well as other type perforations therein or means for removing filtrate all of which are apparent to those skilled in the art.

What is claimed is:

1. A filter element comprising a frame having a pair of longitudinal and end members, screen surrounding substantially all of the exterior frame surface of said frame members and extending throughout the area defined by said frame to provide spaced opposing side screen portions, said side portions of screen being secured together between terminal points spaced from said end members along a longitudinal line substantially parallel to and spaced from said longitudinal members, whereby upper and lower filtrate zones are defined within the confines of said screen which intercommunicate between said terminal points and said end members.

2. A filter element comprising a substantially rectangular frame having longitudinal and end members rigidly secured together, screen surrounding substantially all of the exterior frame surface of said frame members and extending throughout the area defined by said frame to provide spaced opposing side screen portions, said side portions of screen being continuously welded together between terminal weld points spaced from said end members along a longitudinal line substantially parallel to and equispaced from said longitudinal members, whereby upper and lower filtrate zones are defined within the confines of said screen which intercommunicate between said terminal weld points and said end members.

3. A filter element comprising a frame having a pair of longitudinal and end members, one of said longitudinal members providing common means for withdrawing filtrate from said element, screen surrounding substantially all of the exterior frame surface of said frame members and extending throughout the area defined by said frame to provide spaced opposing side screen portions, said side portions of screen being welded together between terminal weld points spaced from said end members along a longitudinal line substantially parallel to and equispaced from said longitudinal members, whereby an upper and lower filtrate zone are defined within the confines of said screen which intercommunicate between said terminal weld points and said end members and afford filtrate passageways to said common means.

4. A filter element for supporting a filter medium comprising a frame having a pair of longitudinal and end members, screen surrounding substantially all of the exterior frame surface of said frame members and extending throughout the area defined by said frame to provide spaced opposing side screen portions, said side portions of screen being welded together between terminal weld points spaced from said end members along a longitudinal line substantially parallel to and equispaced from said longitudinal members, said weld providing upper and lower filtrate zones within the confines of said screen which intercommunicate between said terminal weld points and said end members, and means for withdrawing filtrate from one of said filtrate zones.

5. A filter element comprising a frame having a pair of longitudinal and end members, foraminous sheet surrounding substantially all of the exterior frame surface of said frame members and extending throughout the area defined by said frame, to provide spaced opposing side screen portions, said side portions of foraminous sheet being secured together between terminal points spaced from said end members along a longitudinal line substantially parallel to and equispaced from said longitudinal members, whereby an upper and lower filtrate zone are defined within the confines of said foraminous sheet which intercommunicate between said terminal points and said end members.

6. A filter element comprising a frame having a pair of longitudinal and end members, screen surrounding substantially all of the supporting frame surfaces of said frame members and rigidly attached thereto and extending completely over the area defined by said frame to provide spaced opposing permeable backing for a filter medium, said opposing permeable backing being joined together between terminal points spaced from said end members along a longitudinal line intermediate to and spaced from said longitudinal members, whereby unobstructed upper and lower filtrate zones are defined within the confines of said screen which intercommunicate between said terminal points and said end members, one of said frame members containing slots for the removal of filtrate.

References Cited in the file of this patent
UNITED STATES PATENTS

| | | |
|---|---|---|
| 815,021 | Kelly | Mar. 13, 1906 |
| 859,749 | Davis | July 9, 1907 |
| 864,308 | Kelly | Aug. 27, 1907 |
| 1,032,091 | Sweetland | July 9, 1912 |
| 2,426,618 | Klein | Sept. 2, 1947 |
| 2,594,518 | Teale | Apr. 29, 1952 |